United States Patent [19]

Cresswell

[11] Patent Number: 4,757,868
[45] Date of Patent: Jul. 19, 1988

[54] DISASSEMBLABLE VEHICLE FOR ATTACHMENT TO A POWERED, STEERABLE FRONT WHEEL AND COMPONENTS FOR RIGIDLY HOLDING THE VEHICLE IN ASSEMBLED CONDITION

[76] Inventor: Thomas A. Cresswell, P.O. Box 834, Palm Desert, Calif. 92261

[21] Appl. No.: 13,363

[22] Filed: Feb. 11, 1987

Related U.S. Application Data

[63] Continuation-in-part of Ser. No. 861,365, May 9, 1986, Pat. No. 4,708,219.

[51] Int. Cl.[4] .................. B62D 27/06; B62K 5/06; B62K 11/02
[52] U.S. Cl. ........................... 180/11; 180/13; 180/208; 180/210; 180/907; 248/407; 280/242 NC; 280/287; 280/DIG. 5; 301/95; 301/31; 403/316; 403/330
[58] Field of Search .................. 180/11, 13, 208, 210, 180/907; 280/242 WC, 278, 287, DIG. 5, 87.1; 297/DIG. 4; 248/407; 403/316, 330; 301/9 R, 9 S, 13 R, 18, 30, 31, 33, 35 BJ

[56] References Cited

U.S. PATENT DOCUMENTS

| 1,988,037 | 1/1935 | Fürrer | 248/407 |
| 3,199,621 | 8/1965 | Seaman | 180/11 |
| 4,452,327 | 6/1984 | Mowat et al. | 280/287 X |

Primary Examiner—John J. Love
Assistant Examiner—Mitchell J. Hill
Attorney, Agent, or Firm—Learman & McCulloch

[57] ABSTRACT

A demountable sulky, which may be readily coupled and uncoupled to a steerable, motor-driven front wheel assembly, incorporates a T-bar which is disengageably latched at its front end to the front wheel assembly and disengageably latched to separate wheel supporting frames at its rear ends. The wheel frames demountably support a seat and are held in rigidly spaced apart position in a safe and secure manner by a unique demountable brace system which also is used as a spoke system holding demountable wheel segments in assembled relation.

32 Claims, 7 Drawing Sheets

DISASSEMBLABLE VEHICLE FOR ATTACHMENT TO A POWERED, STEERABLE FRONT WHEEL AND COMPONENTS FOR RIGIDLY HOLDING THE VEHICLE IN ASSEMBLED CONDITION

The present application is a continuation-in-part of my application Ser. No. 861,365, filed May 9, 1986 now U.S. Pat. No. 4,708,219 issued Nov. 24, 1987.

FIELD OF THE INVENTION

This invention relates to knockdown sulky vehicle components which rigidly latch in assembled position, but are readily disassemblable to fit easily into an automobile trunk.

BACKGROUND OF THE INVENTION

Recently it has been possible to commercially purchase a motorized power unit which can be coupled to a conventional occupant-propelled wheel chair, to motorize the chair when desired. Normally these attachable, drive units comprise a front wheel, driven by an electric motor which is supported within a housing which further supports a battery for supplying the necessary electrical current to the electric motor. A typical such powered unit is disclosed in U.S. Pat. No. 4,503,925, and other examples of such units are disclosed in U.S. Pat. No. 3,921,744.

Because conventional wheelchairs are bulky, it is not possible to easily transport them in even the larger automobiles. Even when the wheelchair is of the foldable type, and can be placed in the vehicle trunk, it leaves practically no room in the trunk for anything else, and the motorized drive unit needs to be separately transported in the automotive vehicle.

The present invention relates to personal vehicles, particularly for patients and others who have some physical disability, but are sufficiently physically active to be able to assemble and disassemble a demountable sulky, and transfer the components to and from a vehicle trunk.

Heretofore, no seat-bearing vehicle, which could be broken down into compact component pieces to facilitate ready storage in an automobile trunk, which necessarily carried other items such as baggage to be used on a trip of several days, has been commercially available. One of the prime reasons is believed to have been the lack of a safe and rigid latch system which could be engaged and disengaged by hand without the use of tools. Latching systems of various types have been proposed for various vehicles, and are disclosed, for instance, in U.S. Pat. Nos. 4,452,327 and 4,203,612, but none of these demountable vehicular latch constructions satisfy all the necessary criteria.

SUMMARY OF THE INVENTION

One of the prime objects of the present invention is to design a demountable sulky which readily disconnects from the drive unit which provides its driven front wheel, and then further can be readily broken down by a handicapped person into separate component parts which will readily fit into available spaces in an otherwise packed automobile trunk for transport.

Still another object of the invention is to provide a sulky unit which essentially breaks down into separate rear wheels, a tow bar, and a seat-bearing frame, none of which, when separated from the others, takes up much space.

Still a further object of the invention is to provide a virtually fool-proof latching system, for connecting the various sulky elements, which can be easily manipulated, without the use of tools, by handicapped persons, to permit them to easily disassemble and transport the component parts, and then, after arriving at the destination, rapidly reassemble the sulky for use.

A further object of the invention is to provide a vehicle of the character described which provides for mounting of the disassembled motor drive unit on the sulky, and, further, for reversal of the front wheel bumper so the latter can function as a handle for lifting and pushing or pulling the partly disassembled vehicle.

Another object of the invention is to provide a readily manufactured, demountable latching system which provides safe, rigid support for the various assembled sulky components, while still providing for ease of assembly and disassembly.

The present invention concerns a sulky which may be readily coupled and uncoupled to a steerable, motor-driven, front wheel assembly. The sulky includes a towbar, having a demountable coupling part associated with each of its ends, a mating coupling device on the drive wheel assembly, a demountable seat structure, and dismountable wheels.

Other objects and advantages will become apparent by reference to the drawings, and the following specification wherein:

FIG. 10 is a side elevational view of one of the rear wheels, illustrating the removable wheel segments with the demountable spoke members;

FIG. 11 is a top, sectional plan view on an enlarged scale, illustrating the spoke wheel component interlock system which is employed to lock the diassemblable wheel segments in position, the system being shown in a position in which the spoke has been rotated to bring the lock parts to unlocked position;

FIG. 12 is a fragmentary, top plan view, showing the spoke separated from the rotary core part;

FIG. 13 is a view similar to FIG. 11 with the component parts rotated 90°;

FIG. 14 is an inverse plan view of the rotary core part;

FIG. 15 is a side elevational view of the sleeve which mounts the rotary core part;

FIG. 16 is a demounted view of one of the wheel segments shown in separated position from a fragmentary portion of another of the wheel segments FIG. 17 is a fragmentary, plan view showing the adjacent wheel segment rim sections in interlocked position;

FIG. 18 is an enlarged, partly sectional, side elevational view thereof;

FIG. 19 is an enlarged, transverse sectional view taken on the line 19—19 of FIG. 18.

Figure 1:
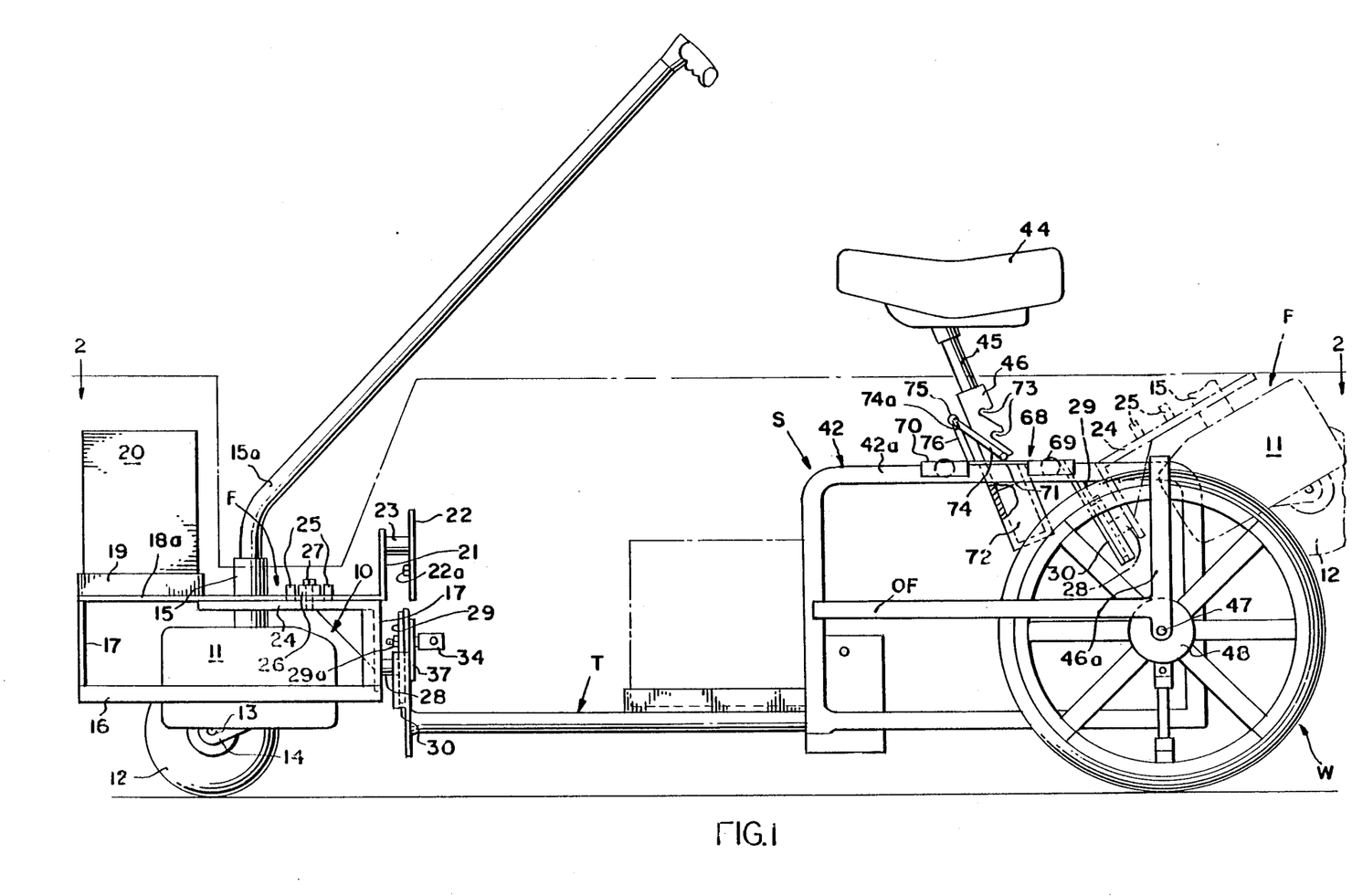
FIG. 1 is a side elevational view of the assembled vehicle.
Figure 2:
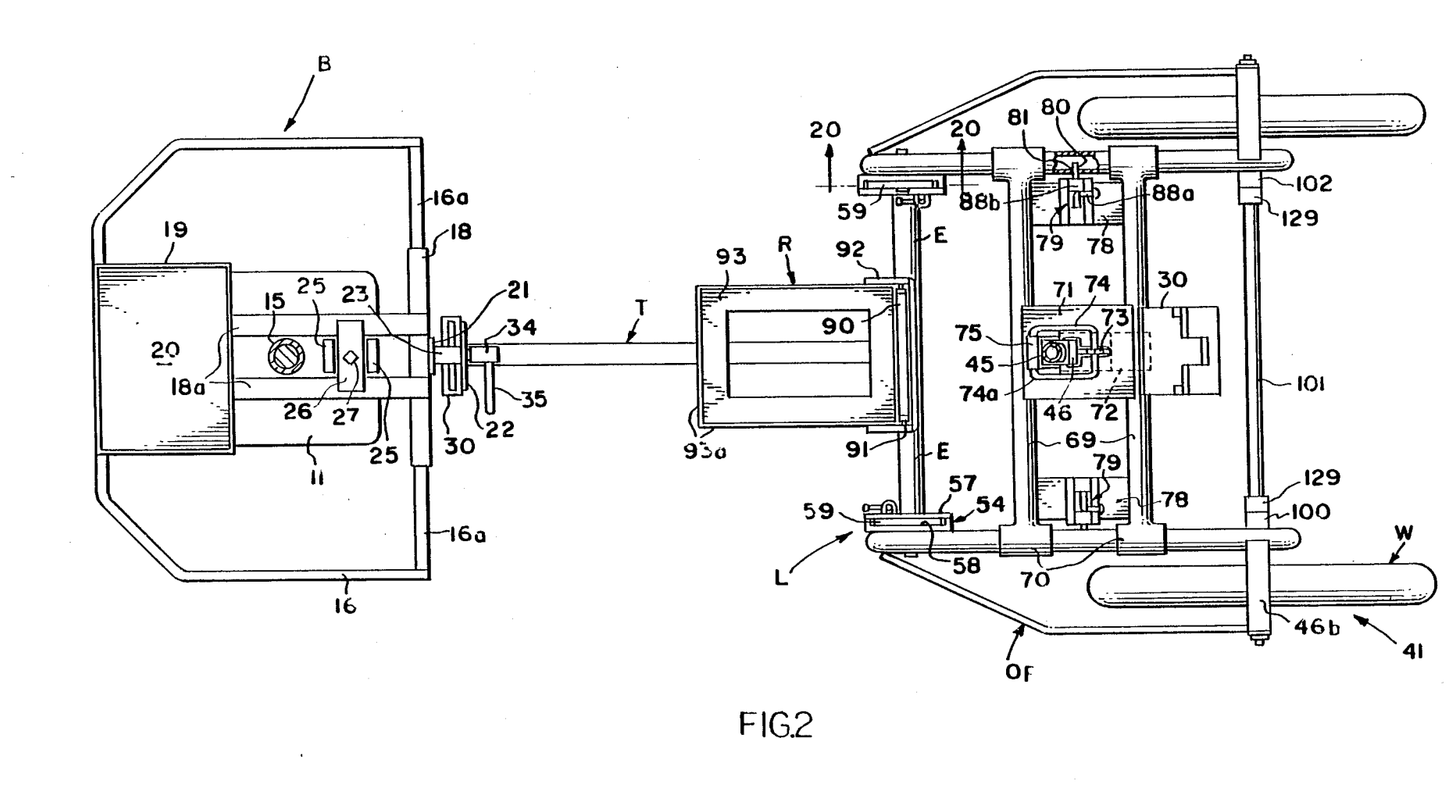
FIG. 2 is a top plan view thereof, taken on the line 2—2 of FIG. 1.

Referring now more particularly to the accompanying drawings, and in the first instance, to FIGS. 1 and 2, wherein a fully assembled, three-wheeled vehicle is depicted, it is to be understood that the front wheel assembly, generally designated F, is of the general type described in my aforementioned parent application, and comprises a steerable drive wheel assembly. A front wheel drive unit of this general type is disclosed, for instance, in U.S. Pat. No. 4,503,925, wherein it connects to a wheelchair, rather than to a sulky vehicle of the type which will be described herein.

The powered and steerable front drive wheel unit or assembly includes a frame, generally designated 10, including a wheel housing 11 for a battery-driven electric motor which drives a front wheel 12, mounted on an axle 13, supported by wheel fork members 14. A steering column socket 15, for disengageably supporting a steering post 15a, extends integrally upwardly from the housing 11, and comprises a hollow sleeve within which a steerable handlebar post is mounted in the manner disclosed in my aforementioned co-pending application.

The front wheel assembly 10 also includes a bumper frame, generally designed B, having a wheel enveloping rail 16 (see FIG. 2), with rear ends 16a connected by legs 17, with a top portion 18. Transversely spaced straps 18a supported by front legs 17 mount a battery receiving platform 19 within which an electric power supply battery 20 is conveniently mounted. Fixed to on the rear ends of the top straps 18a is a vertically upwardly extending support member 21, which supports a hoe-like blade 22, at a spaced distance outwardly therefrom on a stub part 23. As will presently become apparent, the blade 22 is one component of a coupling by which the disassembled bumper assembly B may be detachably connected to a T-shaped towbar generally designated T, which later will be described in more detail.

The top bars 18 are spaced apart, as shown in FIG. 2, so that they can be dropped down over the steering handle socket 15 (once steering post 15a is disengaged therefrom), onto an angle plate 24, fixed to the socket 15, which on its upper face has a pair of spaced apart lugs 25 which disengageably receive a cross-piece 26 fixed in position spanning the top bars 18 of the bumper frame. Bolt member 27 extends down through an opening in cross-piece 26, and threads into the angle plate 24 to releasably anchor the bumper frame B in position.

The front wheel drive assembly F is demountably coupled to the T-shaped towbar T, via coupling components secured to the rear face of angle plate 24, and to the front end of the towbar T, in a manner which now will be described with particular attention to FIGS. 4–9.

As FIG. 1 indicates, projecting rearwardly from the plate 24 is a stub 28 on which a dependent hoe blade 29 is fixed, the stub 28 and hoe blade 29 being of the same dimension as the stub shaft 24 and hoe blade 22. Fixed on the front end of the towbar T to releasably receive the hoe blade 29, is a scabbard, generally designated 30, comprising a front, U-shaped in plan, member 31 and a member 31a, these parts 31 and 31a being spaced apart to provide a slit-like opening 32 which is open at its upper end to receive the blade 29.

The front plate 31a is provided with a U-shaped opening 32a, extending downwardly from its upper end to receive the stub shaft 28 when the blade 29 is inserted. To lock or latch the blade 29 in the scabbard 30, a threaded stud member 33 mounted on a stub shaft 34, is provided to have threaded engagement with a nut 29a, which is welded or otherwise fixed in position on blade 29. A handle 35 attaches to the stub shaft 34. Screw 33 extends through a sleeve 36, carried in a stub plate 37 which is separated from the scabbard rear plate 31 by a flange 38 on sleeve 36, and carries a pair of stubs (see FIG. 6) 39, which are horizontally aligned with the threaded member 33, and extend into openings 40 provided in the scabbard plate 32 and openings 29b provided in blade 29. The screw 33 also extends freely through opening 31a provided in scabbard plate 31 and opening 29c provided in blade 29. Plainly, when the handle 35 is turned in a clockwise direction, the scabbard member 32 is compressed by the flange 38 against the hoe blade 29 which carries nut 29a to lock it securely within scabbard 30. Any tendency to rock is prevented by the stubs 39 extending into the openings 40 in the plate member 32 and 29b in the blade 29.

Figure 9:
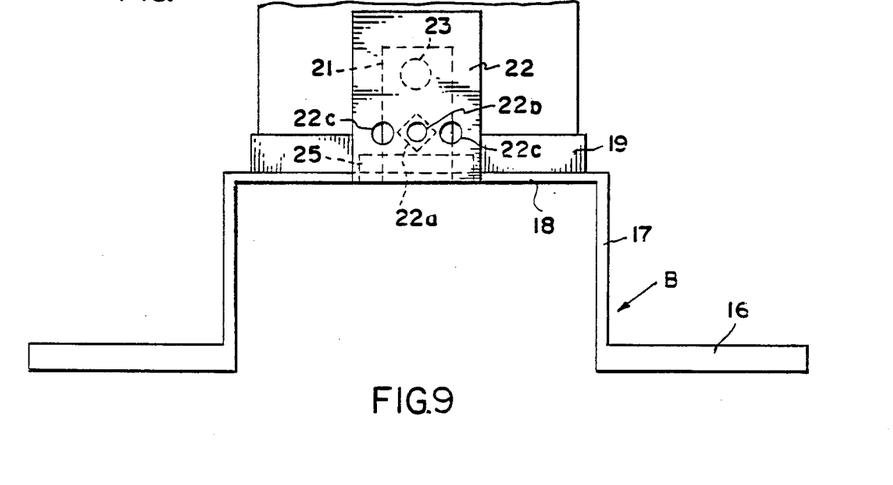
FIG. 9 is a fragmentary, elevational view of the bumper assembly.

As FIG. 9 clearly indicates, the hoe blade 22 is similarly provided with a fixed-in-place nut 22a in back of an opening 22b provided for passing the threaded member 33, and with stub-passing openings 22c. Thus, when the bumper frame B, shown in FIG. 9, is inverted, the blade 22 may alternatively be inserted in the scabbard 30 and locked in position in the manner disclosed in FIG. 3 by the threaded shaft 33 and stub plate 37.

The rideable sulky assembly or sulky frame, generally designated S, in addition to towbar T, is comprised of a pair of detachable rear wheel frames, generally designated 42, comprising rectangular frameworks for disengageably mounting the large rear wheels, generally designated W, which are themselves disassemblable, when it is desired to store the vehicle in a trunk. In addition, the sulky assembly S includes a demountable seat frame assembly, generally designated 43, from which the seat 44 may be disassembled.

As in my previous application, a detachable brace rod assembly is provided to extend between the rear ends of wheel frames 42 to maintain them in rigidly spaced relation at their rear ends. As will later be made clear, this brace rod assembly will be of the same configuration as the demountable spoke assembly disclosed in FIGS. 11–15. Each of the rear wheel assemblies 41 includes, beside the tubular frames 42, an outrigger frame piece, generally designated OF, which functions with the frame 42 to which it attaches to support a dead axle bolt 47 on which the hub 48 on each wheel W is journaled. Each outrigger member OF has an upstanding strap 46a (FIG. 1), from which a horizontal portion 46b extends over to fix to the upper rail portion 42a of the adjacent frame 42.

Figure 20:
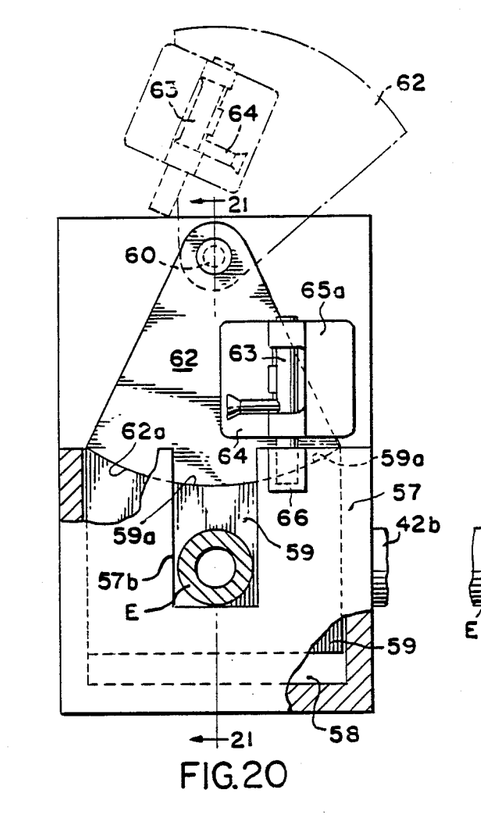
FIG. 20 is an enlarged, fragmentary, transverse sectional view taken on the line 20—20 of FIG. 2, the chain lines indicating a disengaged position of the latch used.
Figure 21:
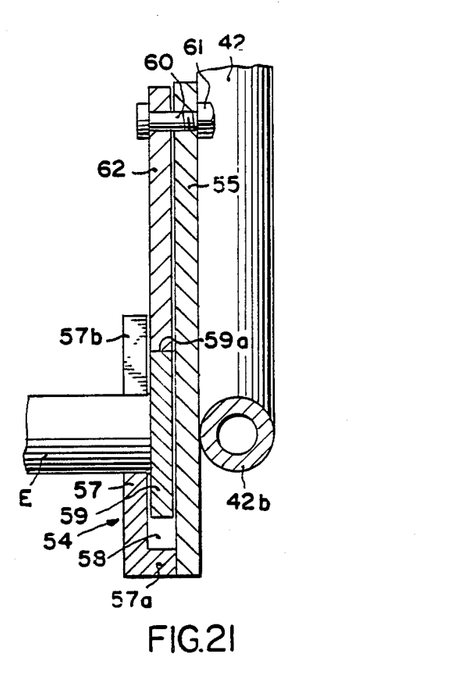
FIG. 21 is a fragmentary, elevational view taken on the line 21—21 of FIG. 20.

The towbar T, which, as FIG. 2 indicates, is a T-shaped member, is detachably connected to each of the rear wheel frames 41 by a latch mechanism, generally designated L which is of the type disclosed in my aforementioned application and is shown herein in FIGS. 20 and 21. Each of the latch mechanisms L includes a scabbard housing 54 made up of a backplate 55, which is fixed to one of the frames 42 in FIG. 7, and a front plate 57, it being understood that an identical housing 54 is also fixed to the other frame 42. Also provided as part of each latch assembly L is a spacer 57a, which rigidly connects the plates 55 and 57 and defines the slot or recess 58 between the plates 55 and 57.

As FIGS. 20 and 21 indicate, the upper end of each front plate 57 is slotted as at 57b, to pass one of the ends E of tubular towbar member T. A hoe-like lock plate 59, having a curvilinear upper face 59a, is fixed on both ends of the two bar T for reception within the space 58 between the walls 55 and 57 of each scabbard housing 54.

Rotatably connected to each of the plates 55, as by a bolt 60, which is secured by a nut 61, is a latching plate 62, having a complementally curvilinear surface 62a which, when the latch parts are in the locked position shown in FIG. 20, mates with the surface 59a on the plate 59 to prevent rotation of the plate 62. Once it is in the position shown in FIG. 20, a slide bolt 63 is provided, which has a manipulating handle 64 in the usual manner. Each slide bolt 63 is slidably and rotatably journaled by the integral curvilinear bearing strap 65, provided on the slide bolt base plate 65a which fixes to each plate 59, and as will be seen in FIG. 20, can be moved downwardly to engage within the curvilinear socket strap 66 fixed to each plate 57.

The latch assembly L which secures the ends E of the towbar T in each instance is identical, and accordingly a description of one will suffice for each in the assembly of the sulkys, once the front end of the T-shaped towbar has been coupled to the front wheel assembly F, and once the latches L have been manipulated to couple the rear ends E of tow bar T to each of the rear wheel assemblies 41, the seat assembly 43 may be mounted in place.

As particularly disclosed in FIG. 2, the assembly 43 includes a mount frame, generally designated 68, which supports the seat 44 on the upper bars 42a of the wheel frames 42. Mount frame 68 consists of a pair of transversely disposed tubular members 69, having semi-cylindrical end pieces or saddles 70, configured to fit over the tubular top members 42a at each side of the vehicle. The tubular members 69 are connected by a central plate 71 from which a dependent socket 72 depends. Seat 44 is supported on a post 45 which has a lower portion 46 telescopically received by the socket 72. Keyhole-shaped openings 73 are provided at vertically spaced intervals in the portion 46 of seat post 45. A rectangular latch member 74, which has its front end 74a journaled in a bearing 75, supported by a brace 76 from the plate 71. Plainly the pivotal latch 74, when engaged within one of the keyhole openings 73, supports the seat 44 rigidly in a vertically selected position.

Fixed also to the seat frame mounting assembly 68, and specifically to the rear crossbar 69, is a scabbard 30 of the character shown in FIGS. 4-9, which is identical to the scabbard described in FIGS. 4-9 and is provided to detachably receive the blade 29 provided on the front wheel drive unit, when it is detached and it is desired to carry it in the manner disclosed by the chain lines in FIG. 1. The reason for providing the scabbard 30 on the seat mounting assembly will presently become more apparent.

As FIG. 2 particularly discloses, the seat assembly 68 simply rests on the top bars 42a of the frames 42. Straps 78 connect the transverse members 69 at their ends and a latch bolt assembly 79 is provided on each of the straps 78. As in my aforementioned application, the latch bolt construction used is identical to the one shown in FIG. 20, and previously described, and it has a slidable and rotatable latch bolt 80 which is receivable in an opening 81 which is bored in the tubular top bar 42a to receive it. It is in this manner that the seat mounting assembly 68 is detachably latched in position at each side. Each bolt 80 is manipulated by a handle 88a, and is slidable in the spaced apart, curvilinear base plate straps 88b provided on each end plate 78.

The towbar T, at its rear end, mounts a U-shaped bracket 90, bearing a pin 91 hingedly mounting a bracket 92 secured to a battery-retaining enclosure, generally designated R. The enclosure comprises a base 93 and side walls 93a. As FIG. 3 indicates, when battery 20 is removed from the like retaining enclosure 19, it may be removed to the enclosure 93.

Figures 10, 11, 12, 13, 14, 15, 16, 17, 18, 19:
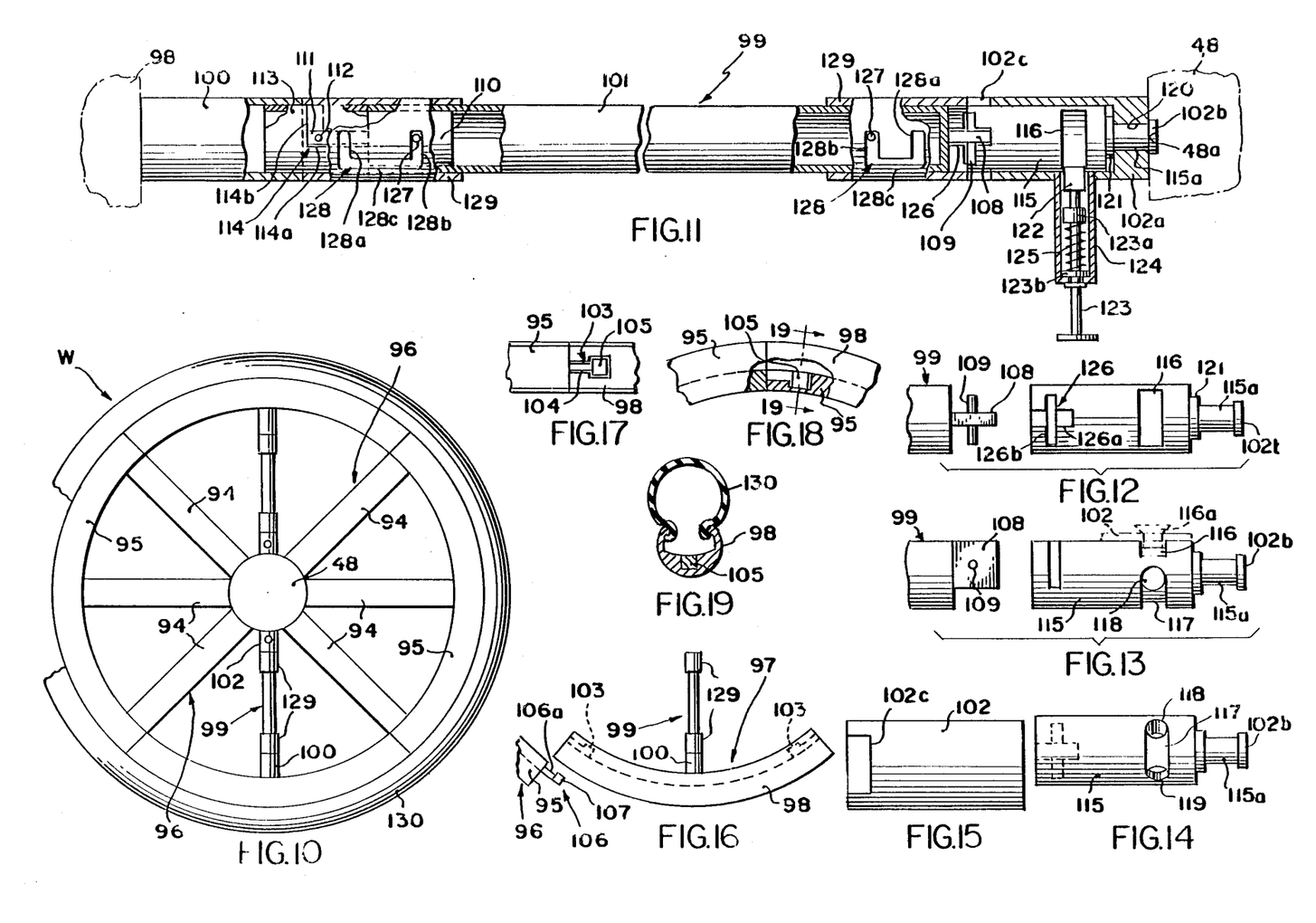

As has previously been indicated, the wheels W, which are disclosed particularly in FIGS. 10-19, are also disassemblable, so that they will fit into a suitcase, or the like, when the vehicle is being transported in "down" condition. In FIG. 10 the hub 48 of each wheel is shown as having fixed spokes 94, connecting it with a pair of opposed rim segments 95 which are rigidly fixed to the spokes 94, to form what may be termed the non-disassemblable segmental portion of the wheel, generally designated 96.

To fill the two 180° opposed gaps in the wheel structure, a pair of demountable segments, each generally designated 97 (see FIG. 16), are provided. Each of these comprises a rim section 98 mating with a rim section 95, and a demountable interlocking spoke section, generally designated 99. Each spoke section 99 interlocks with a sleeve projection 100 fixed to each rim section 98, and includes a central tube 101 which detachably connects with a coupling sleeve member 102 projecting from hub 48.

Provided in the radially inner surface of the rim 95 is a locking recess, generally designated 103 (FIGS. 16-18), which includes a stem receiving portion 104, and an enlarged head-receiving portion 105, portion 105 being enlarged with respect to the portion 104 in both width and height, as shown in FIGS. 17 and 18. A locking stem, generally designated 106, extends peripherally from the end of each rim section 95, and includes a stem 106a received in the recess portion 104, and a stem head portion 107 received in the recess portion 105. As FIGS. 16-18 indicate, the head portion 105 of each stem is of increased height or depth and seats in the recess 105 to lock the rim sections 95 and 98 against relative circumferential movement as FIG. 16 indicates. Rim section 98 is assembled with rim sections 95, by simply moving the section 98 radially outwardly (in FIG. 16) with respect to the rim sections 95. It is then that the demountable spokes 99 are inserted between the rim sections 98 and the hub 48 to lock the rim sections 98 in position radially.

Spoke sleeve 101, at its radially inner end, has an axially projecting bayonet prong or tongue 108, with an offset pin 109 rigidly projecting from each side thereof. At its opposite end sleeve 101 has a rigidly fixed plug or core 110, provided with an axially projecting bayonet tongue 111, having a pin 112 which projects from only one side thereof. The sleeve 100 is provided with an internal, fixed, axially projecting core sleeve 13, the projecting portion of which is provided with an L-shaped slot 114, including an axial portion 114a and a portion 114b at right angles thereto.

In FIG. 11, the demountable spoke 99 is shown in an assembled, but unlocked, position, in which the pin 112 was removed from a locked position within slot portion 114b when the sleeve 101 was rotated. Each projecting plug sleeve 102 is provided with a core plug 115, which is particularly disclosed in FIGS. 12-14. At its radially inner end, it is provided with an arcuate groove 116 and a 180° opposite arcuate groove 117. Provided in the groove 117, for a purpose to presently become apparent, are a pair of circumferentially spaced, blind bores or openings 118 and 119. Plug 115 is reduced in size as at 115a, so as to be journaled in an opening 120 provided in the end wall 102a of the tubular projection 102, shaft or axle 120 having a head portion 102b received in a recess 48a provided in hub 48. A washer 21 can be utilized between the sleeve 102, which is fixed to the hub 48, and the plug 115 which rotates within sleeve 102. The rotary position of the core plug 115 is releasably maintained in one of two positions, by a detent 122, which seats in one of the openings 118 or 119. Detent 122 is mounted on a plunger 123, which is movable within a housing 124 fixed to the sleeve 102. Plunger 123 has a collar 124, fixed in position such that a coil spring 125, provided in the housing 124 encircling plunger stem 123, between the collar 124 and a slide bearing 126 for rod 123, normally, urges the detent 122 inwardly. Detent 122 can be removed from either the bore 118 or the bore 119, by pulling outwardly on the plunger 123 and further compressing the spring 125. A set screw 116a can be used to ride in groove 116 and limit rotation of the core 115. Provided in the outer end of the rotatable plug 115, as particularly indicated in FIGS. 12-14, is a cruciate opening generally designated 126, which includes an axial portion 126a for receiving tongue 108, and a radial portion 126b for receiving the projectig ends of the pin 109.

Each end of spoke sleeve 101 is provided with a radially projecting pin 127, which is received within a U-shaped slot 128 provided in an extensible sleeve 129, which is telescopically received on the spoke sleeve 101. In the extended position in which both sleeves 129 are shown in FIG. 11, they cover the opening 114 in projecting plug 113, and a portion of the opening 126 in plug 150, and abut the members 100 and 102 respectively. Each of the U-shaped slots 128 includes an outer leg 128a, an inner leg 128b, and a connecting leg 128c. When the sleeves 129 are rotated relative to the spoke sleeve 101 to dispose the pin 127 in the portion 128c of the slots 128, and then moved axially inwardly on the spoke sleeve 101 to retract the sleeve 129 sufficiently to clear the plugs 115 and 113 at each end, it will be plain that the spoke 99 can simply be lifted from the position in which the bayonet tangs 115 and 108 are shown in FIG. 11. The cruciate groove 126 and the L-shaped groove 114 are upwardly or outwardly open at this time to permit movement of the removable spoke 99 bodily away from the members 100 and 102 in a direction perpendicular to the axes of members 100 and 102, while maintaining the members 99 parallel to the axes of members 100 and 102. The sleeves 129 are always retained on the core sleeve 101 by the pins 127, and, of course, are locked axially in position on the core sleeve 101 when the pins 127 are retained in the leg portions of the grooves 128.

Provided in the inner end of the member 102 is a slot 102c which is not covered by the one sleeve 129, but is open to receive the cruciate tang parts 108 and 109 when the spoke 99 is placed in position. Plainly, rotation of the sleeve 101 in a direction to move the pin 112 to a fixed position in the slot portion 114b, will similarly move cruciate tang 108-109 to a position behind the interior wall portion 102d of hub end lug 102, and thus positively prevent withdrawal of the removable spoke 99.

When the rim segments 95 and 98 have been placed in assembled position and removable spokes 99 have been locked in position, deflated pneumatic tire 130 can be fitted to Wheel rim sections 95 and 98 in the manner indicated in FIG. 19, and inflated via a suitable tire inflation valve. Before the spoke sleeve 101 is rotated from the FIG. 11 position to position the cruciate tang 108-109 in locked position, the plunger 123 must be pulled outwardly to remove the detent 122 from the opening 118. When the rotation is sufficient for the end of detent 122 to contact the bore 119, the plunger 123 is released so that detent 122 seats in the bore 119 and positively holds the parts in the locked position.

THE OPERATION

In operation, the sulky is operated in the FIG. 1 position until it is desired to demount the sulky vehicle and store it in the trunk and luggage of the user who is, for example, taking a lengthy automobile trip. The first step can be the removal of the steering handle from the socket 15. The seat 44, including posts 45, and its dependent member 46, can then be demounted by moving the seat and member 46 downwardly while disengaging the latch 74 from the opening 73 in which it is engaged, and then lifting the assembly upwardly. Handle 35 is then moVed counterclockwisely to back threaded member 33 out sufficiently for stubs 39 to clear the stub opening 29c, and the member 33 to clear the opening 29a in blade 29, so that the front wheel drive unit can be lifted and hoe blade 29 removed from the top of scabbard 30. To make it easier, battery 20 is, of course, first disconnected from the electric motor provided in motor housing 11, and removed from platform 19.

In the next phase of disassembly, towbar T can be disconnected for separate storage by unlatching bolt latches and swinging the plates 62 to the chain line position shown in FIG. 20, after which the hoe blades 59 can be lifted out of the scabbards 54. Removal of the seat support frame assembly is accomplished by manipulating latch bolts 80 and simply lifting the framework 68 from wheel frames 42. At this point, wheels W can be removed from the wheel frames 42 by removing axle bolts 47. Then sleeves 129 can be rotated relative to the spoke core sleeves 101 to permit them to be moved to inwardly telescoped position thereon. At this point, with plunger 123 pulled outwardly, core sleeve 101 can be rotated relative to fixed core 113 and fixed members 100 and 102, to remove the pin 112 from the slot portion 114b and to revolve the plug 115 via the cruciate tang 108-109 such that the tang 108-109 is now opposite the opening 102c in member 102. In this position of the parts, if the plunger 123 is released, it will be received in the opening 118, and the tang parts will be in the position indicated in FIG. 11, which permits the spoke RazH 99 to be simply moved outwardly and disengaged.

When each removable spoke 99 has been removed the removable rim segment members 97 can simply be moved inwardly in a radial direction to disengage the stem 106 from the locking recesses 103. The sulky will then have been fully disassembled and its component parts can be readily packed for travel. As has been noted, brace rod 45 is identical with the configuration disclosed in FIG. 11 and includes a projection 100 on one frame 42 at the lower rear ends thereof, and an aligned projection 102 in transverse alignment on the other frame 42. The ends are releasably coupled in exactly the same manner and disassembly of the part 101 of the brace 45 is exactly as described for spoke 99—to separate wheel frames 42.

Figure 3:
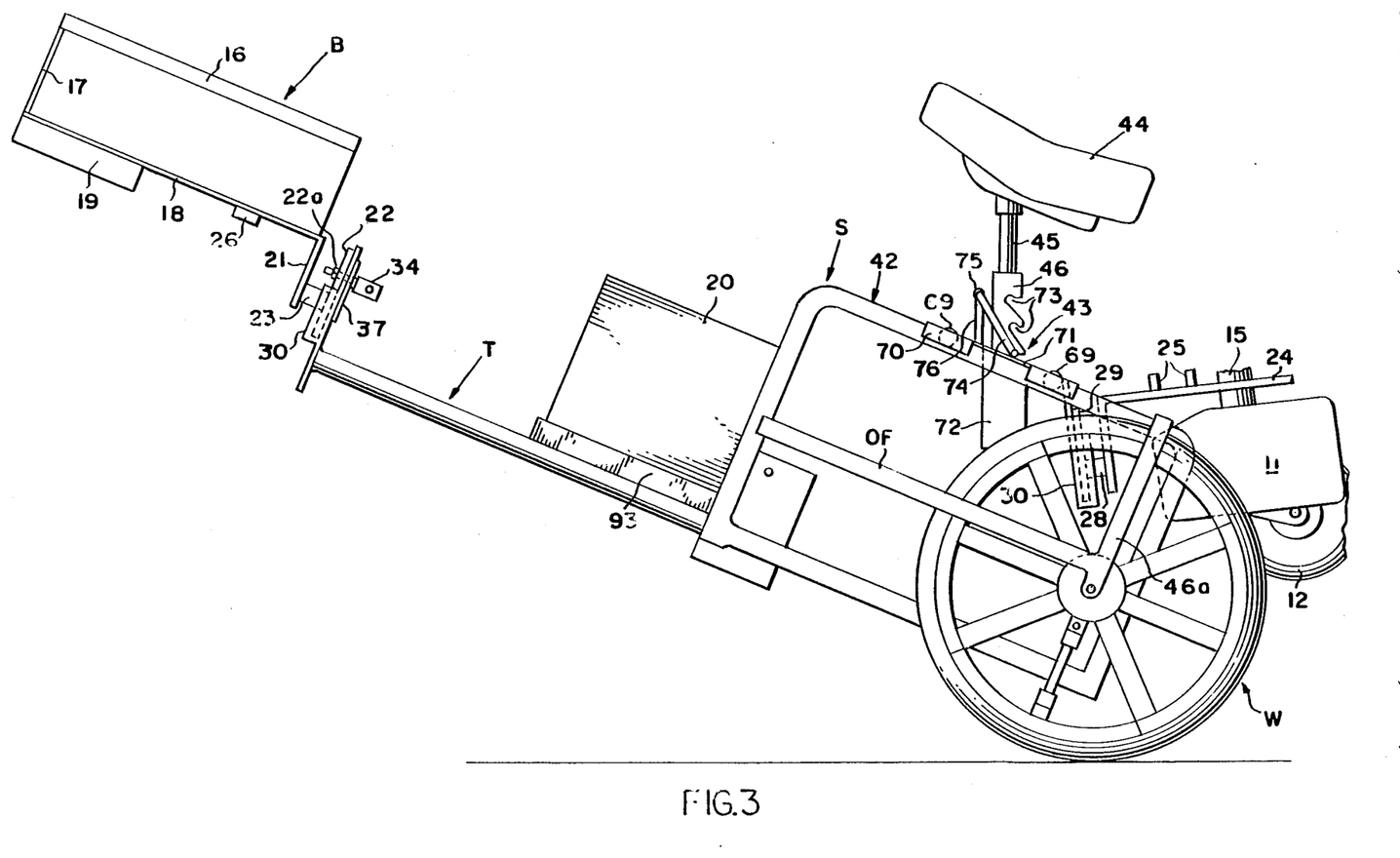
FIG. 3 is a side elevational view of the vehicle with the motor-driven drive wheel demounted and remounted on the rear of the sulky, and the bumper frame demounted and remounted in inverted position to form a handle for pushing or pulling a vehice in this partly disassembled state.
Figures 4, 6:
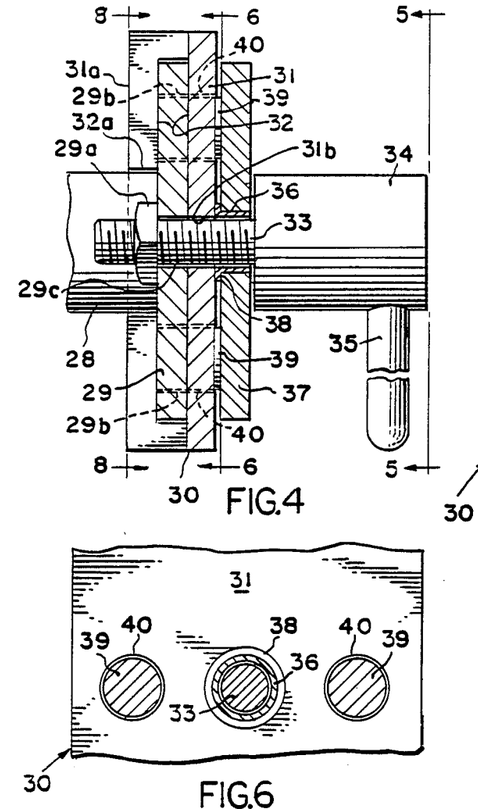
FIG. 4 is an enlarged fragmentary, sectional top plan view of the blade and scabbard latch system which disengageably connects the towbar and front wheel drive unit, taken on the line 4—4 of FIG. 5.
FIG. 6 is a fragmentary, sectional, elevational view, taken on the line 6—6 of FIG. 4.
Figure 5:
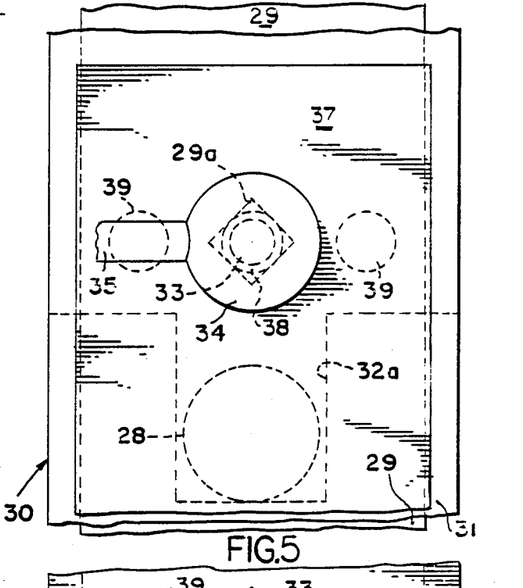
FIG. 5 is an end elevational view thereof taken on the line 5—5 of FIG. 4.
Figure 7:
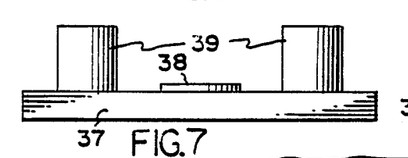
FIG. 7 is an enlarged top plan view of the stub clamp plate which is secured to the front wheel drive unit assembly.
Figure 8:
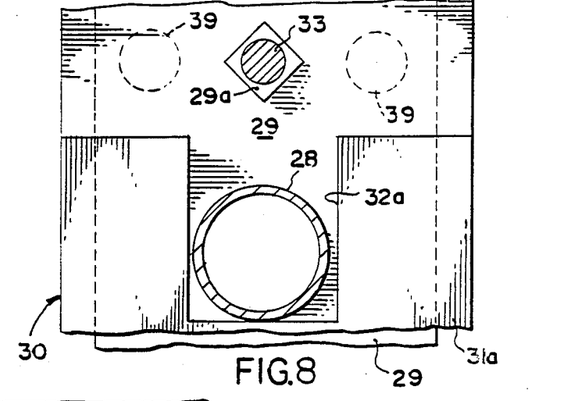
FIG. 8 is a fragmentary, sectional, end elevational view, taken on the line 8—8 of FIG. 1.

In FIG. 3, I have shown a partially disassembled position of some components of the sulky which is utilized when it is desired that the sulky be manually pushed or pulled, rather than driven. In this position of the parts, the steering wheel assembly has been removed from the steering wheel post socket 50, and the battery 20 has been disconnected and moved to the retaining enclosure 93. The bolt 27 has also been backed off to permit removal of the bumper frame B from the drive wheel assembly. Once the hoe blade 19 is removed from the scabbard 30 in the manner previously indicated, and inserted in the inversely disposed scabbard 30 provided on the seat mount frame 68 (in the manner indicated in broken lines in FIG. 1) the hoe blade may be received in the socket 30 at the front end of the towbar T in the inverted position indicated in FIG. 3. In this position the inverted U-shaped bumper assembly B, provides a ready handle facilitating pushing or pulling of the sulky.

A FURTHER EMBODIMENT

Figure 22:
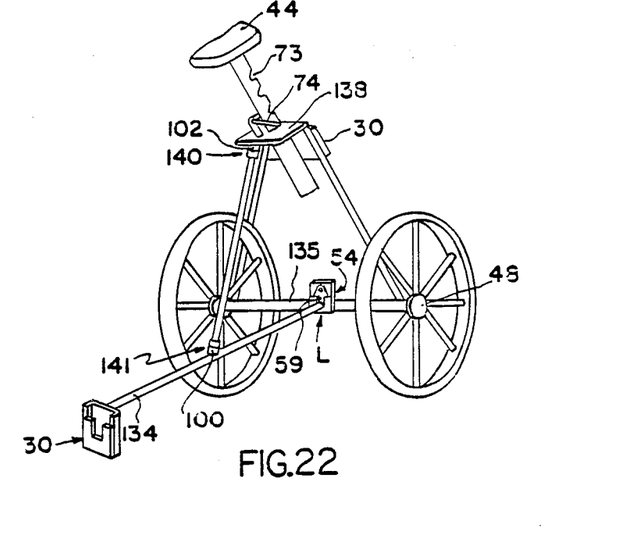
FIG. 22 is a perspective, elevational view illustrating a still further embodiment of the invention in which coupling systems which have previously been illustrated may be utilized.
Figure 23:
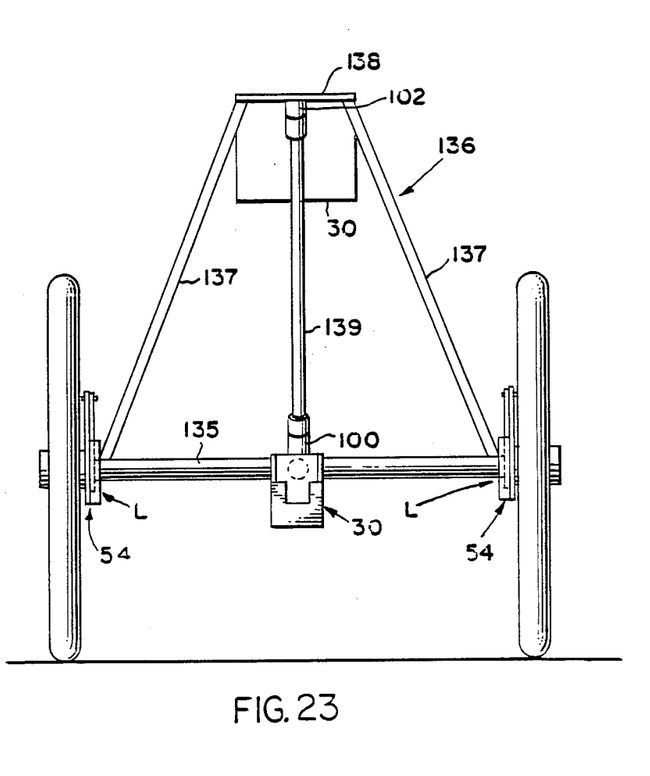
FIG. 23 is a front elevational view thereof.

In FIGS. 22 and 23, a still further modified embodiment of the invention has been disclosed, which breaks down into components of least bulky nature. The T-shaped towbar here has been replaced by an elongate, linear towbar element 134, which has a front end connected exactly in the manner that the prior towbar T is connected. Thus, there is a scabbard 30 on the front end of bar 34, for receiving the hoe blade 29 mounted on the rear end of the same front wheel drive assembly F. The description of the scabbard assembly provided on the front end of towbar T earlier in this specification is fully descriptive, and will not be repeated here.

At its rear end towbar 134 is coupled to an axle 135 which forms part of an integrated seat supporting sulky frame, generally designated 136. The connection of towbar 134 to 135 is via the latchable coupling L disclosed in FIGS. 20 and 21, wherein the hoe blade 59 is welded to the rear end of the bar 134, and the scabbard 54 is rigidly fixed to the axle 135. In all respects, the latch mechanism, designated L here also, is as previously described, and disclosed in FIGS. 20 and 21, and like numbers have been used where appropriate to designate the parts shown. In view of this prior description, the latch coupling L will not further be described since its construction and operation is identical to the latch mechanism L previously described.

The seat support assembly 136 further includes upwardly convergent brace bars 137, welded to the axle 125, and a seat support plate 138, welded or otherwise securely fixed to the support bars 137. Plate 138 corresponds to the plate 71 shown in FIG. 3 and earlier described, and the seat 44 is adjustably supported by the plate 138 and latched in place in exactly the same manner. Thus, the same numerals are utilized to describe those similar parts which are shown, and they will not again be described. As previously, the scabbard 30 which has been previously described, is provided on the rear side of the plate 138 in the same manner as it was provided on the rear side of the plate 71, and similarly can be used to support the front wheel mounting assembly in the manner disclosed in FIG. 3., At the front of plate 138, a brace comprising a brace rod or brace post element 139 of demountable character is used to connect the towbar 134 with the seat plate 138. A coupling structure, generally designated 140 and 141, respectively, is used at the upper and lower ends of the bar 139 to latch the bar 139 in bracing position. The coupling structure used at each end of the bar 139 has previously been described, and is disclosed in FIGS. 10-15. It is the same coupling structure used to secure the ends of brace rod 45 in FIG. 2, and the ends of demountable spokes 99. Thus, the same numerals will be used to designate like parts, and the description and operation of these coupling members will not be repeated. It is the plate 138 which is provided with the projection sleeve 102, which is welded or otherwise rigidly fixed to the plate 138 at the predesignated inclination. The projection sleeve 100 is welded or otherwise fixed at the appropriately aligned inclined angle to towbar 124.

Wheels W may be those disclosed in FIG. 10, or may be much smaller diameter wheels. The wheel hub 48 of each is provided with a scabbard 54, which makes up one component of the same latch assembly L disclosed in FIGS. 20 and 21. The hoe blades 59, which are demountably received in the scabbards 54, are fixed to the ends of the axle 135 and the construction is exactly as previously described with reference to FIGS. 20 and 21. Accordingly, the description will not be repeated.

In the FIGS. 22 and 23 embodiments of the invention, towbar 134 is demountable from the front wheel assembly in the manner previously described, and brace bar 139 is decoupled from the towbar 134 and the frame 136. By disengaging the hoe blade at the rear of bar 134 from the scabbard carried by the axle 135, the bar 134 is disconnected from axle 135. The wheels W can then be removed from the axle 135 by disengaging the latch assembly L at either end. This leaves the trapezoidal frame 136 and the seat 44 can be decoupled from it by releasing latch 74 in the manner previously described.

While only several embodiments of the invention have been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

What is claimed is:

1. A demountable three-wheeled, sulky vehicle for the handicapped and others desiring assistance comprising:

a. a front wheel drive unit comprising a steering column mounting assembly with a motor driven wheel, the assembly mounting a motor for driving the wheel in rotation;

b. sulky frame means including axle means for supporting a pair of transversely spaced apart rear wheels in tricycle formation with said front wheel and including rear wheels journaled on said axle means;

c. coupling means for detachably securing the front wheel drive unit and sulky frame means comprising blade and scabbard means including an interacting vertically disposed hoe-like blade component projecting vertically from a front to rear extending leg and a, transversely exending vertically disposed scabbard component having front and rear walls parallel to said blade which are bounded by side walls and all of which form a slit, open at one end, for receiving said blade component;

d. latch means for releasably locking said blade component rigidly in the scabbard component; and e. a seat means mounted on said sulky frame means at a raised level above said rear wheels.

2. The invention defined in claim 1 wherein said scabbard component has a slot open to its said one end sized to receive the leg.

3. The invention defined in claim 2 wherein said drive unit assembly has a rearwardly projecting leg mounting said blade component at a generally right angle thereto; and said scabbard component has an outer plate, with a slot open to its upper end and extending from a lower support wall defining the marginal end of said slot to receive said drive unit leg.

4. The invention defined in claim 1 wherein said blade component carries a nut and said scabbard component carries an anti-rotation lock plate with a bore aligned with said nut; said blade component and scabbard having also bores aligned with said nut; and a screw member carried by said scabbard component extending through said bores and threadably engageable with said nut for disengageably locking said drive unit blade component in said drive unit scabbard.

5. The invention defined in claim 1 wherein a scabbard component is inversely positioned on said seat means and configured to receive the blade component on said drive unit assembly to support the drive unit assembly.

6. The invention defined in claim 5 wherein said seat means includes a seat and a wheel frame spanning brace structure disengageably connected to the upper end of each of said wheel frames, said seat being disengageably connected with said brace structure and said brace structure carrying said scabbard component which supports the drive unit.

7. The invention defined in claim 1 wherein said seat means includes a seat having a dependent post with a vertically spaced notches therein, and said sulky frame means has a brace structure extending upwardly to support said seat above said wheels; there being a vertical socket fixed by said brace structure for telescopically receiving said seat post; and pivotal latch means carried by said brace structure and disengageably received in one of said notches for locking said seat in a selected vertically supported position.

8. The invention defined in claim 7 in which said latch means comprises a generally U-shaped latch member joined to a front journaling section, and bearing means on said brace structure supports said latch member for pivotal movement about a generally horizontal axis of pivot.

9. The invention defined in claim 1 wherein each of said rear wheels comprises at least three wheel segments, one of which is central to the others and includes an axle hub; said sulky frame means having journal means for disengageably mounting said hub; said central segment including a wheel rim portion; said other segments also having rim portions, matching with said central section rim portion to form a wheel rim; intermeshing socket and protrusion means provided on the said rim portions of the central segment and said rim portions of the other segments; and disengageable spoke members carried by said rim portions of said other segments and said hub and cooperating with said socket and protrusion means to lock said segments in assembled position.

10. The invention defined in claim 9 wherein said socket and protrusion means comprises protrusions extending circumferentially from the ends of the rim portions of said other segments, and sockets extending circumferentially in the rim portion of said central segment and open to the rim portion ends.

11. The invention defined in claim 9 wherein said other segments have radially inwardly extending rim projections and said cental segment has radially outwardly extending hub projections; and said spokes disengageably couple the hub projections on the central segment with the rim projections on said other segments; said spokes being of a radial length greater than the radial distance between said rim projections and hub projections.

12. The invention defined in claim 11 wherein bayonet and bayonet slot means is provided on said radial rim projections and hub projections respectively to anchor said spokes and lock said segments in assembled relation upon rotation of said spokes relative to said rim and hub projections.

13. The invention defined in claim 11 wherein at least one of said spokes is an assembly comprising a rigid, rotatable rod having its ends received by said hub projections and rim projections; said rim projections and hub projections each comprising a sleeve with an inner core providing a bayonet slot in its end, and there being a bayonet projection on each end of the rotatable rod receivable in one of said bayonet slots, one of said cores being rotatable such that angular rotation of said rod relative to the one of said sleeves with the rotatable core seats the bayonet projection in the bayonet slot within said one of said sleeves in a manner to prevent disengagement of said rotatable rod in such a locked position of angular rotation.

14. The invention of claim 13 in which releasable detent means anchors said rotatable core in said locked position relative to said sleeve.

15. The invention of claim 13 in which said rotatable core is releasably held in one of two positions by spring biased detent means.

16. The invention of claim 14 in which said rotatable core has a pair of circumferentially spaced bores, either of which receives said detent means dependent on whether the core is in a rotary position of lock or unlock.

17. The invention of claim 13 wherein cover sleeves carried by said rod at each end are axially slidable thereon to and from positions of abutment with said sleeves.

18. The invention of claim 17 wherein said cover sleeves are rotatable on said rods and have a pin and slot connection therewith for anchoring them in axially inner and outer positions on said rod.

19. The invention defined in claim 1 wherein a wheel encompassing bumper frame is provided for protecting said wheel, releasably connected with said drive unit and having one of said components mounted thereof for interacting reception with the interacting component on the front portion of the towbar when the drive unit is disengaged so that said bumper frame can function as a handle for pulling or pushing the vehicle when the front end of the vehicle is lifted.

20. The invention defined in claim 19 wherein said bumper frame and drive unit have a tongue and groove connection, and disengageable lock means locks them in coupled relation.

21. The invention defined in claim 1 in which one of said front and rear scabbard plates has a slot open to said slit and sized for snugly receiving said leg.

22. A demountable wheel assembly comprising separable wheel segments, one of which carries an axle hub; each segment having a wheel rim portion, and the rim portions matching to form a circumferential wheel rim when the segments are in assembled relation; the wheel segment carrying the axle hub having a radial hub locking part and another wheel segment rim portion having a radially aligned locking part when the segments are in assembled relation; and disengageable spoke means having locking means interlocking with said locking parts to anchor said wheel segments in assembled relation.

23. The demountable wheel assembly of claim 22 wherein said parts on the hub and the rim portion comprise radial projections, each comprising a sleeve with an inner core having a bayonet slot in its end, said disengageable spoke means comprising a rotatable rod having a bayonet projection on each end receivable in one of the bayonet slots in said cores, one of said cores being rotatable relative to its sleeve from an unlocked position to a locked position relative to the sleeve in which it is received; and releasable detent means associated with the sleeve having the rotatable core for anchoring said rotatable core in either locked or unlocked position.

24. The invention of claim 23 in which said rotatable core has a pair of circumferentially spaced bores, either of which receive said detent means dependent upon whether the core is in a rotary position of lock or unlock.

25. The invention of claim 24 wherein cover sleeves carried by said rotatable rod at each end are axially slideable thereon to and from positions of abutment with said sleeves.

26. The invention of claim 25 wherein said cover sleeves are rotatable on said rod and have a pin and slot connection therewith for anchoring them in axially inner and outer positions on said rod.

27. The invention defined in claim 22 wherein each of said wheel assemblies is made up of at least three wheel segments, one of which is central to the other and has an axle hub rigidly connected to its rim portion by fixed spokes, the other wheel segments each being connected to the central segment by disengageable spoke means.

28. The invention defined in claim 27 wherein the adjacent rim portions of the separable segments have intermeshing socket and protrusion means provided thereon.

29. A demountable three-wheeled, sulky vehicle for the handicapped and others desiring assistance comprising:
   a. a front wheel drive unit comprising a steering column mounting assembly with a motor driven wheel, the assembly mounting a motor for driving the wheel in rotation;
   b. sulky frame means including axle means for supporting a pair of transversely spaced apart rear wheels in tricycle formation with said front wheel and including rear wheels on said axle means;
   c. coupling means for detachably securing the front wheel drive unit and sulky frame means comprising interacting male and female components which are releasably received, one within the other, in interconnected position;
   d. said coupling means incorporating latch means for releasably locking said components in interconnected position;
   e. a seat structure for said sulky frame means including a seat;
   f. a seat support frame for said sulky frame means comprising upwardly extending, vertically transversely inwardly inclined posts fixedly connected to said seat structure and connected to said axle means; and
   g. a releasable brace post element extending downwardly transversely centrally with respect to said rear wheels at a vertically inclined angle from said seat structure to connect to said sulky frame means.

30. The invention defined in claim 29 wherein said components comprise an interacting, hoe-like blade component and a slit-like transversely extending scabbard component open at one end for receiving said blade component.

31. The invention defined in claim 29 wherein projection and socket means demountable connects said brace post element with said seat structure and with said sulky frame means, and detachably connects each wheel with said axle element.

32. The invention defined in claim 29 wherein said axle means, inwardly inclined posts, and seat support frame are an integrated frames unit.

* * * * *

UNITED STATES PATENT AND TRADEMARK OFFICE
CERTIFICATE OF CORRECTION

PATENT NO. : 4,757,868

DATED : July 19, 1988

INVENTOR(S) : Thomas A. Cresswell

It is certified that error appears in the above-identified patent and that said Letters Patent is hereby corrected as shown below:

The term of this patent subsequent to November 24, 2004, has been disclaimed.

Signed and Sealed this

Sixth Day of December, 1988

*Attest:*

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,757,868
DATED : July 19, 1988
INVENTOR(S) : Thomas A. Cresswell

It is certified that error appears in the above-identified patent and that said Letters Patent is hereby corrected as shown below:

In column 2, line 39, change "vehice" to -- vehicle --.

In column 7, line 52, change "projectig" to -- projecting --.

In column 8, line 25, change "Wheel" to -- wheel -- ; line 48, change "moVed" to -- moved -- ; line 58, after "latches" insert -- 63 -- .

In column 9, line 8, delete "RazH" ; line 38, after "blade" insert -- 22 -- .

Signed and Sealed this

Twenty-first Day of February, 1989

Attest:

DONALD J. QUIGG

Attesting Officer

Commissioner of Patents and Trademarks